(12) United States Patent
Kim

(10) Patent No.: US 6,774,150 B2
(45) Date of Patent: Aug. 10, 2004

(54) PARTIALLY FLUORINATED COPOLYMER BASED ON TRIFLUOROSTYRENE AND SUBSTITUTED VINYL COMPOUND AND IONIC CONDUCTIVE POLYMER MEMBRANE FORMED THEREFROM

(75) Inventor: Hae-Kyoung Kim, Yongin (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 252 days.

(21) Appl. No.: 09/895,163

(22) Filed: Jul. 2, 2001

(65) Prior Publication Data

US 2002/0015874 A1 Feb. 7, 2002

(30) Foreign Application Priority Data

Jun. 30, 2000 (KR) .......................................... 2000-37394

(51) Int. Cl.[7] ................................................. C08J 5/20
(52) U.S. Cl. ........................ 521/33; 521/27; 526/243; 526/245; 526/251; 526/253; 526/255
(58) Field of Search .................... 521/27, 33; 526/243, 526/245, 251, 253, 255

(56) References Cited

U.S. PATENT DOCUMENTS

| | | | |
|---|---|---|---|
| 3,341,366 A | | 9/1967 | Hodgdon, Jr. et al. |
| 4,012,303 A | * | 3/1977 | D'Agostino et al. ... 204/159.17 |
| 5,422,411 A | | 6/1995 | Wei et al. |
| 5,498,639 A | | 3/1996 | Wei et al. |
| 5,602,185 A | | 2/1997 | Stone et al. |
| 5,684,192 A | | 11/1997 | Stone et al. |
| 5,773,480 A | | 6/1998 | Stone et al. |
| 5,834,523 A | | 11/1998 | Steck et al. |

FOREIGN PATENT DOCUMENTS

WO  WO 96/40798  12/1996

OTHER PUBLICATIONS

Wodzki et al. Die Angewandte Markromolekulare Chemie 106 (1982) 23–35.*
Ryzhov et al. Plasticheskie Massy (1976), (2), 68–71.*
Chemical abstracts, vol. 97, No. 2, Jul. 12, 1982, Columbus, Ohio, U.S.; Abstract No. 6870, Freidlin, Yu G. et al, "Synthesis of a copolymer of α, β, β–trifluorostyrene with divinylbenzene," XP002184416.
Chemical abstracts, vol. 99, No. 16, Oct. 17, 1983, Columbus, Ohio, U.S.; Abstract No. 123393, Freidlin, Yu G. et al, "Synthesis and properties of crosslinked copolymers of α, β, β–trifluorostyrene and methacrylic acid," XP002184417.

* cited by examiner

Primary Examiner—Helen L. Pezzuto
(74) Attorney, Agent, or Firm—Lee & Sterba, P.C.

(57) ABSTRACT

A trifluorostyrene and substituted vinyl compound based partially fluorinated copolymer, an ionic conductive polymer membrane including the same, and a fuel cell adopting the ionic conductive polymer membrane, wherein the partially fluorinated copolymer has formula (1):

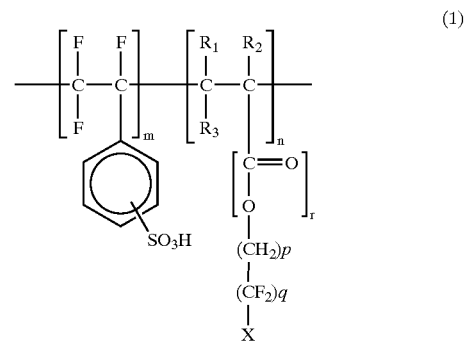

where each of $R_1$, $R_2$ and $R_3$ is F, H or $CH_3$; X is a hydroxy group or a trifluoromethyl group; m is an integer greater than zero; n is an integer greater than zero; and p, q and r are zero or integers greater than zero.

6 Claims, 4 Drawing Sheets

PARTIALLY FLUORINATED COPOLYMER BASED ON TRIFLUOROSTYRENE AND SUBSTITUTED VINYL COMPOUND AND IONIC CONDUCTIVE POLYMER MEMBRANE FORMED THEREFROM

BACKGROUND OF THE INVENTION

1. Field of the Invention

The present invention relates to a partially fluorinated copolymer based on a trifluorostyrene and a substituted vinyl compound, and to an ionic conductive polymer membrane formed of the same. More particularly, the present invention relates to a partially fluorinated copolymer with trifluorostyrene units and substituted vinyl compound units, and to an ionic conductive polymer membrane, formed of the copolymer, which has excellent mechanical properties and a low degree of swelling caused by water absorption, and to a fuel cell having the ionic conductive polymer membrane.

2. Description of the Related Art

Recently, with the advance of portable electronic devices and wireless communications devices, the need for high performance fuel cells for these portable devices has increased. In order to improve the efficiency of fuel cells, a polymer membrane which ensures a high ionic conductivity and reduces the cross-over of fuel, particularly of methanol, is needed.

The fuel cell is a power generating system which converts the energy generated by electrochemical reaction of a fuel and an oxidizing gas to electrical energy for use. Fuel cells are classified into, for example, fuel cells with a molten carbonate salt electrolyte operable at a high temperature of 500–700° C., fuel cells with a phosphoric acid electrolyte operable around 200° C., fuel cells with an alkali electrolyte operable in a wide range of temperature from room temperature to 100° C. or less, fuel cells with a proton exchange membrane as electrolyte, and fuel cells with a solid electrolyte operable at a high temperature of 600–1000° C.

Polymer electrolyte fuel cells include the proton exchange membrane fuel cell (PEMFC) using hydrogen gas as fuel, and the direct methanol fuel cell (DMFC) which uses liquid methanol from the anode as direct fuel.

The proton exchange membrane fuel cell (PEMFC), a future clean energy source emerging as a substitute for fossil energy, has high output density and energy conversion efficiency. Also, the PEMFC is workable at room temperature and is easy to seal and miniaturize, so that it can be extensively used in the fields of pollution-free vehicles, household power generating systems, mobile telecommunications, portable power generating systems, and medical, military and space equipment.

The PEMFC is a power generator for producing direct current through the electrochemical reaction of hydrogen and oxygen. The basic structure of such a cell is shown in FIG. 1. Referring to FIG. 1, the PEMFC has a proton exchange membrane 11 interposed between the anode and the cathode.

The proton exchange membrane 11 is formed of a solid polymer electrolyte with a thickness of 20–200 $\mu$m. The anode and cathode include support layers 14 and 15 for supplying reaction gas, and catalytic layers 12 and 13 in which oxidation/reduction of the reaction gas occurs, which collectively form a "gas diffusion electrode." In FIG. 1, reference numeral 16 represents a current collector.

In the PEMFC having the above structure, with the application of hydrogen gas as a reaction gas, hydrogen molecules are decomposed into hydrogen ions and electrons by an oxidation reaction in the anode. The hydrogen ions so produced reach the cathode through the proton exchange membrane 11.

Meanwhile, in the cathode oxygen molecules take electrons from the anode through the membrane and are reduced to oxygen ions by reduction. The oxygen ions so produced react with hydrogen ions from the anode and produce water molecules.

As shown in FIG. 1, in the PEMFC, the catalytic layers 12 and 13 of the gas diffusion electrode are formed over the support layers 14 and 15, respectively. The support layers 14 and 15 are formed of carbon cloth or carbon paper. The surface of the support layers 14 and 15 are treated so as to allow easy passing of reaction gas, of water to the proton ion exchange membrane 11, and of water obtained as the reaction product.

On the other hand, the DMFC has the same structure as the PEMFC, but uses liquid methanol, instead of hydrogen, as a reaction fuel. As the liquid methanol is supplied to the anode, an oxidation reaction occurs in the presence of a catalyst, so that hydrogen ions, electrons and carbon dioxide are generated. The DMFC has poor cell efficiency compared with the PEMFC because of lower catalytic activities of the anodic fuels. However, use of liquid fuel makes its application to potable electronic devices easier.

The previously mentioned fuel cells usually employ an ionic conductive polymer membrane as the proton exchange membrane disposed between the anode and the cathode. The ionic conductive polymer membrane, as an electrolyte of the fuel cell, serves to transfer hydrogen ions from the anode to the cathode, and prevents the fuels for each of the anode and cathode from being mixing with each other. In addition, the ionic conductive polymer membrane is formed of a polymer membrane with sulfonyl groups as side chains. Because the polymer membrane contains water, a sulfonic acid group of the polymer electrolyte is dissociated in the water medium so that the sulfonyl group is produced with ionic conductivity.

The ionic conductive polymer membrane should have the following characteristics: a high ionic conductivity, electrochemical stability, mechanical properties suitable as a membrane, thermal stability at working temperature, easy processing into a thin film for reduced resistance, low cost and low degree of swelling caused by liquid absorption, etc.

The most widely known ionic conductive polymer membrane has a polytetrafluoroethylene backbone having sulfonyl group as side chains. However, this polymer membrane is of little practical use due to its high manufacturing cost and complicated manufacturing process. To solve these problems, an ionic conductive polymer membrane formed of polytrifluorostyrene, a partially fluorinated polymer, has been suggested in U.S. Pat. Nos. 5,422,411; 5,498,639; 5,602,185; 5,684,192; 5,773,480; and 5,834,523. However, the ionic conductive polymer based on sulfonated polytrifluorostyrene is known to be very brittle and thus has difficulty in practical use. For this reason, to enhance the mechanical strength of the polymer membrane, there has been used a copolymer of trifluorostyrene, and a polymer which is able to be polymerized with triflurostyrene, for example, a monomer containing fluorine with a long side chain, such as heptadecafluorodecyl acrylate, heptadecafluorodecene, hydroxypropyl methacrylate, hydroxybutyl acrylate and hydroxyethyl methacrylate.

When the ionic conductive polymer membrane is applied to a fuel cell, the polymer membrane absorbs water and serves as a medium which allows hydrogen ions to pass. As the polymer membrane absorbs water, the thickness and the area of the polymer membrane varies by swelling. However, if the degree of the swelling is excessive, due to the difference between the dry state and the full water absorption state, manufacturing a fule cell with the polymer membrane becomes difficult.

SUMMARY OF THE INVENTION

It is a first feature of the present invention to provide a copolymer based on trifluorostyrene and a substituted vinyl compound.

A second feature of the present invention is to provide an ionic conductive polymer membrane formed of the copolymer, which has a low degree of swelling caused by water absorption and excellent mechanical properties.

A third feature of the present invention is to provide a fuel cell with improved efficiency, which employs the ionic conductive polymer membrane.

In accordance with one aspect of the present invention, there is provided a partially fluorinated copolymer having formula (1) below, comprising trifluorostyrene units and substituted vinyl compound units:

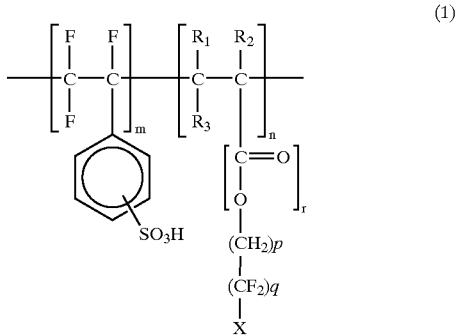

(1)

wherein each of $R_1$, $R_2$ and $R_3$ independently is selected from the group consisting of F, H and $CH_3$; X is a hydroxy group or a trifluoromethyl group; m is an integer greater than zero; n is an integer greater than zero; and p, q and r are zero or integers greater than zero.

In accordance with another aspect of the present invention, there is provided an ionic conductive polymer membrane comprising a partially fluorinated copolymer having formula (1) with trifluorostyrene units and substituted vinyl compound units:

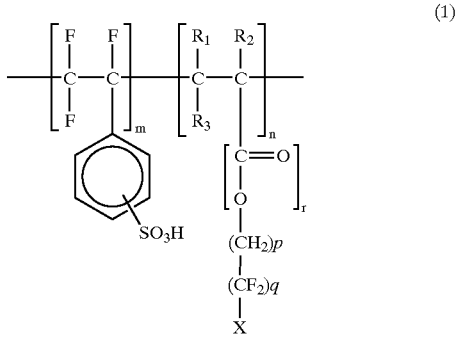

(1)

wherein each of $R_1$, $R_2$ and $R_3$ independently is selected from the group consisting of F, H and $CH_3$; X is a hydroxy group or a trifluoromethyl group; m is an integer greater than zero; n is an integer greater than zero; and p, q and r are zero or integers greater than zero.

According to a further aspect of the present invention, there is provided a fuel cell comprising an ionic conductive layer that comprises a partially fluorinated copolymer having formula (1) with trifluorostyrene units and substituted vinyl compound units:

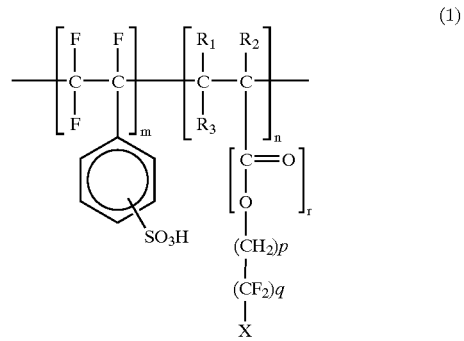

(1)

wherein each of $R_1$, $R_2$ and $R_3$ independently is selected from the group consisting of F, H and $CH_3$; X is a hydroxy group or a trifluoromethyl group; m is an integer greater than zero; n is an integer greater than zero; and p, q and r are zero or integers greater than zero.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
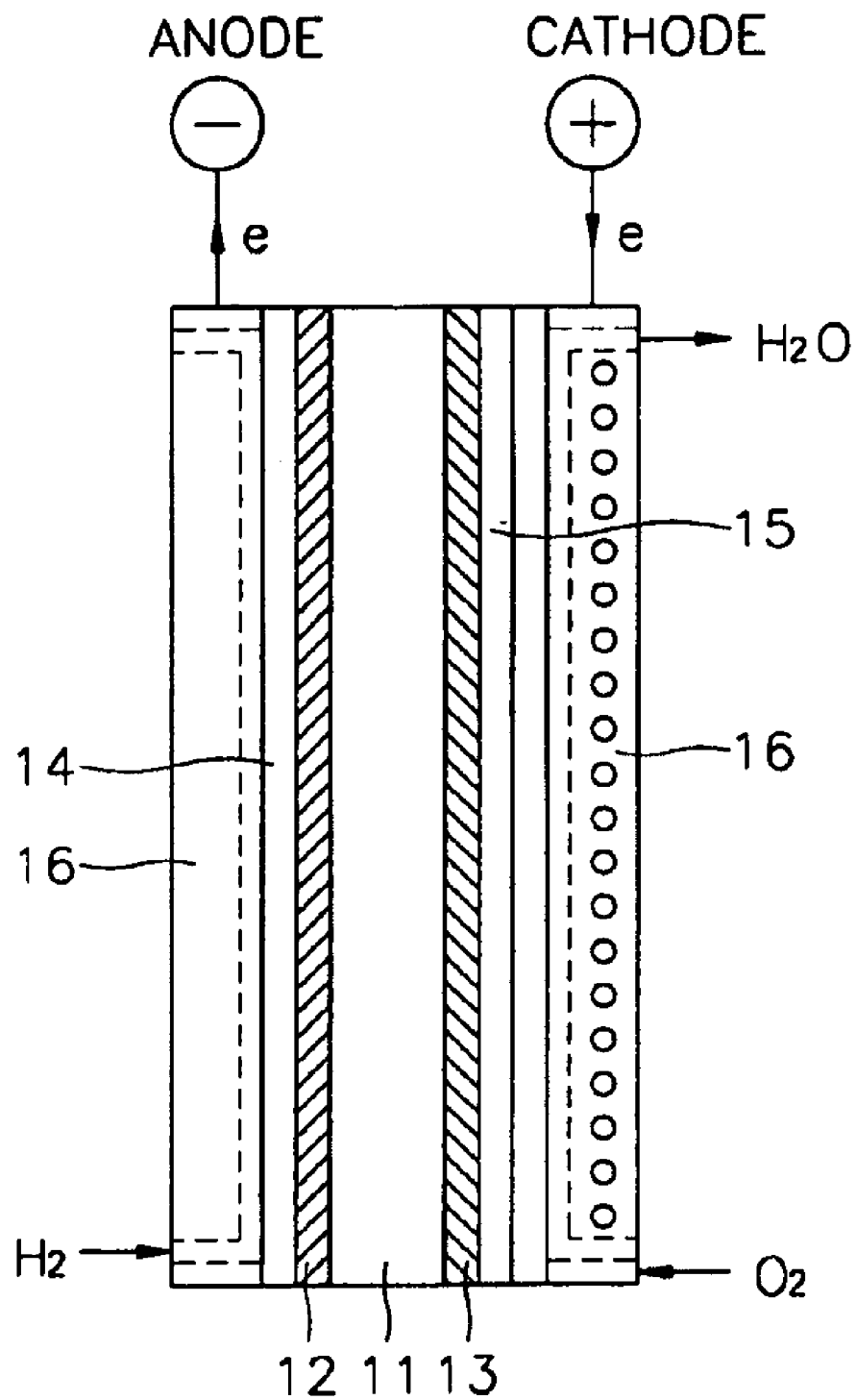
FIG. 1 illustrates the structure of a conventional fuel cell adopting a proton exchange membrane.

Priority Korean Patent Application Serial No. 00-37394, filed Jun. 30, 2000, is hereby incorporated in its entirety by reference.

A partially fluorinated copolymer having formula (1) above according to the present invention is derived by polymerizing a trifluorostyrene monomer and a substituted vinyl compound monomer, and sulfonating the polymerized product. The trifluorostyrene monomer can include, without limitation, α, β, β-trifluorostyrene. The substituted vinyl compound monomer can include, without limitation, heptadecafluorodecyl methacrylate, heptadecafluorodecene and heptadecafluoro-decyl acrylate.

The polymerization reaction of the trifluorostyrene monomer and the substituted vinyl compound monomer will be described in greater detail. In the present invention, the polymerization reaction preferably is performed by an emulsion polymerization method. A polymerization initiator, for example, potassium persulfate, can be added for the polymerization. Dodecylamine hydrochloride or sodium stearate (soap) can be used as an emulsifier.

When the polymerization of the trifluorostyrene monomer and the substituted vinyl compound monomer is completed, an emulsifier used in the emulsion polymerization is removed and the copolymer is subjected to sulfonation with a sulfonation agent such as chlorosulfonic acid. The degree of sulfonation can be varied by adjusting the amount of the sulfonation agent. After the sulfonation is completed, an ionic conductive polymer membrane for fuel cells is obtained by casting a solution containing the resultant sulfonated copolymer or hot pressing the resultant sulfonated copolymer.

In formula (1) above, preferably, m is an integer from 1 to 50, n is an integer from 1 to 50, p is zero or an integer from 1 to 12, and q is zero or an integer from 1 to 12.

Preferably, the partially fluorinated copolymer having formula (1) above has a weight average molecular weight of about 30,000 to about 500,000. If the weight average molecular weight of the partially fluorinated copolymer is less than about 30,000, formation of a film is difficult. If the weight average molecular weight of the partially fluorinated copolymer exceeds about 500,000, the solubility of the copolymer in organic solvents is poor.

Specific embodiments of the partially fluorinated copolymer having formula (1) include the compounds having formulas (2) through (5):

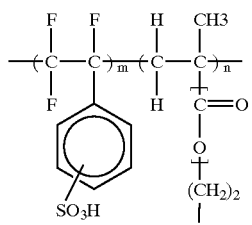
(2)

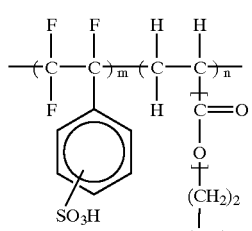
(3)

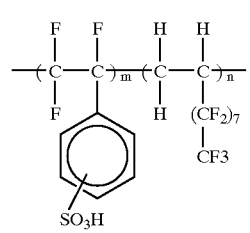
(4)

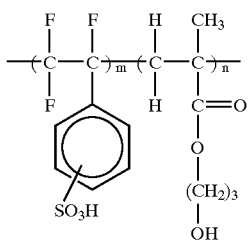
(5)

where m is an integer greater than zero; and n is an integer greater than zero. Preferably, in formula (1) through (5), m is an integer from 1 to 50; and n is an integer from 1 to 50.

The copolymer having formula (1) above can be partially crosslinked with a crosslinking agent, which is a multi-functional compound having two or more unsaturated groups per molecule. The crosslinking reaction takes place when a mixture of the copolymer having formula (1) and the crosslinking agent is subjected to casting or hot pressing to form a polymer membrane. Note that when the degree of sulfonation of the copolymer represented by formula 1 is high, the copolymer of formula 1 is partially self-crosslinked.

Useful crosslinking agents include, without limitation, divinyl benzene, diallyl ether, trially ether, diglycidyl ether, ethylene glycol dimethacrylate, and mixtures of these compounds. When partially crosslinking the copolymer having formula (1) with a crosslinking agent, ionic conductivity slightly decreases and the degree of swelling in the wet state is reduced. Thus, a difference in volumes of the polymer membrane in the dry and wet states is decreased.

Exemplary crosslinked compounds are give below. The copolymer illustrated on the right is derived when divinyl benzene is used as the crosslinking agent. The copolymer illustrated on the left is obtained as a result of self-crosslinking of a copolymer with a high degree of sulfonation.

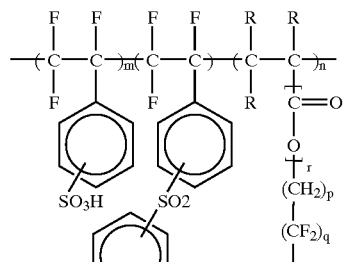

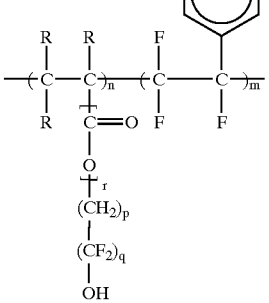

-continued

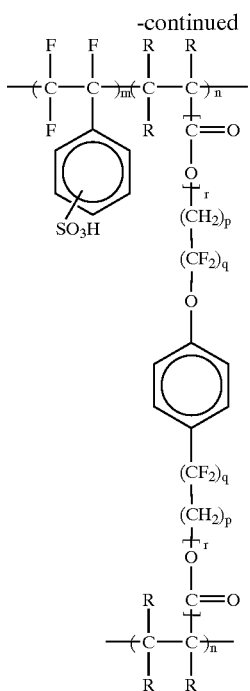

where m is an integer greater than zero; n is an integer greater than zero; and p and r are zero or integers greater than zero. Preferably, m is an integer from 1 to 50, n is an integer from 1 to 50, p is zero or an integer from 1 to 12, and q is zero or an integer from 1 to 12.

On the other hand, in manufacturing a fuel cell according to the present invention, a catalytic layer is formed over both sides of the ionic conductive polymer membrane formed of the copolymer having formula (1), and bonded with each electrode support layer, so that a membrane and electrode assembly (MEA) is completed. Next, a current collector is attached to both sides of the MEA, thereby resulting in a complete fuel cell.

The present invention will be described in greater detail by means of the following examples. The following examples are for illustrative purposes and are not intended to limit the scope of the invention.

Synthesis Example 1

80 g α,β,β-trifluorostyrene, 15 g heptadecafluorodecyl methacrylate, 600 ml deionized water and 9.5 g dodecylamine hydrochloride were placed into a 4-necked flask equipped with a mechanical stirrer and mixed. During the mixing process, the flask was conditioned in a nitrogen atmosphere. Next, the flask containing the reactants was purged with nitrogen gas for 30 minutes, and was then kept at 55±1° C. A solution obtained by dissolving 0.35 g potassium persulfate in 5 g deionized water was injected into the reaction mixture with a syringe. The mixture was left at 55±1° C. for 72 hours for reaction.

30 g sodium chloride and 50 g ice were added to the reaction mixture and filtered in a vacuum to obtain copolymer powder. The resultant copolymer powder was washed with deionized water and then with cold methanol. The washed copolymer powder was dried at room temperature for a day, and dried again in a vacuum oven at room temperature for 5–6 hours.

4.78 g of the resultant copolymer was completely dissolved in 300 ml chloroform, and 2 cc chlorosulfonic acid was added to the solution with a syringe. The mixture was reacted at 65° C. for 3 hours, and cooled to room temperature. Next, the solvent was decanted from the reaction product. Then, methanol was added to the resultant product and evaporated in a vacuum to remove the remaining solvent, thereby resulting in a sulfonated copolymer having formula (2) above. As for the sulfonated copolymer so obtained, m and n of formula (2) were 9 and 2, respectively. The weight average molecular weight of the resultant copolymer was 95,000.

IR(KBr, cm$^{-1}$): v 2900, 1730, 1300, 1100–1400

Synthesis Example 2

50 g α,β,β-trifluorostyrene, 10 g heptadecafluorodecyl methacrylate, 400 ml deionized water and 5.0 g dodecylamine hydrochloride were placed into a 4-necked flask equipped with a mechanical stirrer and mixed. During the mixing process, the flask was conditioned in a nitrogen atmosphere. Next, the flask containing the reactants was purged with nitrogen gas for 30 minutes, and was kept at 55±1° C. A solution obtained by dissolving 0.25 g potassium persulfate in 5 g deionized water was injected into the reaction mixture with a syringe. The mixture was left at 55±1° C. for 72 hours for reaction.

25 g sodium chloride and 50 g ice were added to the reaction mixture and filtered in a vacuum to obtain copolymer powder. The resultant copolymer powder was washed with deionized water and then with cold methanol. The washed copolymer powder was dried at room temperature for a day, and dried again in a vacuum oven at room temperature for 5–6 hours.

6 g of the resultant copolymer were completely dissolved in 300 ml chloroform, and 1.2 cc chlorosulfonic acid was added to the solution with a syringe. The mixture was reacted at 65° C. for 3 hours, and cooled to room temperature. Next, the solvent was decanted from the reaction product. Then, methanol was added to the resultant product and evaporated in a vacuum to remove the remaining solvent, thereby resulting in a sulfonated copolymer having formula (3) above. As for the sulfonated copolymer so obtained, m and n of formula (3) were 8 and 2, respectively. The weight average molecular weight of the resultant copolymer was 80,700.

IR(KBr, cm$^{-1}$): v 3000, 1730, 1300, 1100–1400

Synthesis Example 3

20 g α,β,β-trifluorostyrene, 5 g heptadecafluorodecene, 400 ml deionized water and 2.9 g dodecylamine hydrochloride were placed into a 4-necked flask equipped with a mechanical stirrer and sufficiently mixed. During the mixing process, the flask was conditioned in a nitrogen atmosphere. Next, the flask containing the reactants was purged with nitrogen gas for 30 minutes, and was kept at 55±1° C. While maintaining the temperature of the reaction mixture at the selected temperature, a solution obtained by dissolving 0.2 g potassium persulfate in 5 g deionized water was injected into the reaction mixture with a syringe. The mixture was left at 55±1° C. for 72 hours for reaction.

After the reaction was completed, 50 g ice and 25 g sodium chloride were added to the reaction mixture and filtered in a vacuum to obtain copolymer powder. The resultant copolymer powder was washed with deionized water and then with cold methanol. The washed copolymer powder was dried at room temperature for a day, and dried again in a vacuum oven at room temperature for 5–6 hours.

6 g of the resultant copolymer was dissolved in 300 ml chloroform, and 1.2 cc chlorosulfonic acid was dropwise added to the solution with a syringe. The mixture was reacted at 65° C. for 3 hours, and cooled to room temperature. Next, the solvent was decanted from the reaction product. Then, methanol was added to the resultant product and evaporated in a vacuum to remove the remaining solvent, thereby resulting in a sulfonated copolymer having formula (4) above. As for the sulfonated copolymer so obtained, m and n of formula (4) were 13 and 3, respectively. The weight average molecular weight of the resultant copolymer was 82,500.

IR(KBr, cm$^{-1}$): v 3000, 1300,1100–1400

Synthesis Example 4

90 g α,β,β-trifluorostyrene, 30 g hydroxypropyl methacrylate, 500 ml deionized water and 11.8 g dodecylamine hydrochloride were placed into a 4-necked flask equipped with a mechanical stirrer and sufficiently mixed. During the mixing process, the flask was conditioned in a nitrogen atmosphere.

Next, the flask containing the reactants was purged with nitrogen gas for 30 minutes, and was kept at 55±1° C. While maintaining the temperature of the reaction mixture at the selected temperature, a solution obtained by dissolving 0.445 g potassium persulfate in 5 g deionized water was injected into the reaction mixture with a syringe. The mixture was left at 55±1° C. for 72 hours for reaction.

After the reaction was completed, 30 g sodium chloride and 50 g ice were added to the reaction mixture and filtered in a vacuum to obtain copolymer powder. The resultant copolymer powder was washed with deionized water and then with cold methanol. The washed copolymer powder was dried at room temperature for a day, and dried again in a vacuum oven at room temperature for 5–6 hours.

8.5 g of the resultant copolymer was dissolved in 500 ml chloroform, and 1.6 cc chlorosulfonic acid was dropwise added to the solution with a syringe. The mixture was reacted at 68° for 3 hours, and cooled to room temperature. Next, the solvent was decanted from the reaction product. Then, methanol was added to the resultant product and evaporated in a vacuum to remove the remaining solvent, thereby resulting in a sulfonated copolymer having formula (5) above. As for the obtained sulfonated copolymer, m and n of formula (5) were 15 and 14, respectively. The weight average molecular weight of the resultant copolymer was 93,000.

IR(KBr, cm$^{-1}$): v 3600, 2900–2700, 1730

Ionic conductive polymer membranes were manufactured by hot pressing the sulfonated copolymers derived in Synthesis Examples 1 through 4 at a temperature of 100° C. and a pressure of 23 Mton for 5 minutes. Variations in ionic conductivity of the obtained ionic conductive polymer membranes with respect to temperature were measured.

Figure 2:
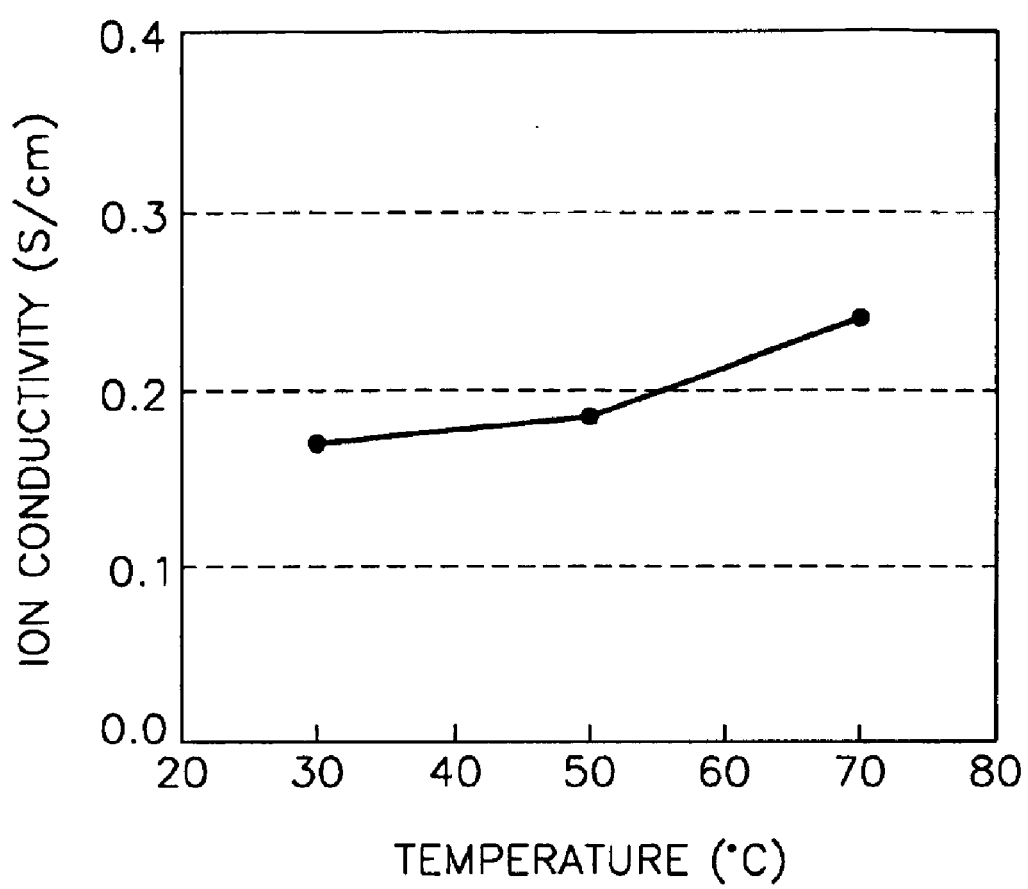
FIG. 2 is a graph illustrating the variation in ionic conductivity of the inventive ionic conductive polymer membrane of Synthesis Example 1 with respect to temperature.

FIG. 2 illustrates the ionic conductivity of the ionic conductive polymer membrane formed of the sulfonated copolymer of Synthesis Example 1 with respect to temperature. As shown in FIG. 2, the ionic conductivity of the ionic conductive polymer membrane is 10$^{-1}$ S/cm or more in the range of 30–70° C., which is satisfactory for use as a proton exchange membrane for fuel cells.

As for the ionic conductive polymer membranes manufactured using the polymers of Synthesis Examples 2 through 4, the ionic conductive properties show a tendency similar to those of the ionic conductive polymer membrane for Synthesis Example 1.

Synthesis Example 5

600 ml deionized water, 11.6 g dodecylamine hydrochloride, and 100 g α,β,β-trifluorostyrene were placed into a 4-necked flask equipped with a mechanical stirrer and sufficiently mixed with the stirrer in a nitrogen atmosphere.

Next, the flask containing the reactants was purged with nitrogen gas for 30 minutes, and was kept at 55±1° C. After dissolving 0.8 g potassium persulfate in deionized water, the solution was injected into the reaction mixture with a syringe.

The mixture was left for 48 hours for reaction. After the reaction was completed, 50 g ice and 100 g sodium chloride were added to the reaction mixture and filtered in a vacuum to obtain copolymer powder. The resultant copolymer powder was washed with deionized water and then with cold methanol. The washed copolymer powder was dried at room temperature for a day, and dried again in a vacuum oven at room temperature for 5–6 hours. The resultant copolymer has formula (1) above, where m=4.

Example 1

An ionic conductive polymer membrane was manufactured by hot pressing the sulfonated copolymer obtained in Synthesis Example 1 at a temperature of 100° C. and a pressure of 23 Mton for 5 minutes.

A catalytic layer was formed on both sides of the ionic conductive polymer membrane, and bonded with each electrode support layer, so that a membrane and electrode assembly (MEA) was manufactured. A current collector was attached to both sides of the completed MEA, thereby resulting in a complete proton exchange membrane fuel cell (PEMFC).

Example 2

A PEMFC was manufactured in the same manner as in Example 1, except that the sulfonated copolymer of Synthesis Example 2 was used instead of the sulfonated copolymer of Synthesis Example 1.

Example 3

An ionic conductive polymer membrane was manufactured by hot pressing the sulfonated copolymer obtained in Synthesis Example 1 at a temperature of 100° C. and a pressure of 23 Mton for 5 minutes.

A catalytic layer was formed on both sides of the ionic conductive polymer membrane, and bonded with each electrode support layer, so that a membrane and electrode assembly (MEA) was manufactured. A current collector was attached to both sides of the completed MEA, thereby resulting in a complete direct methanol fuel cell (DMFC).

Figure 3:
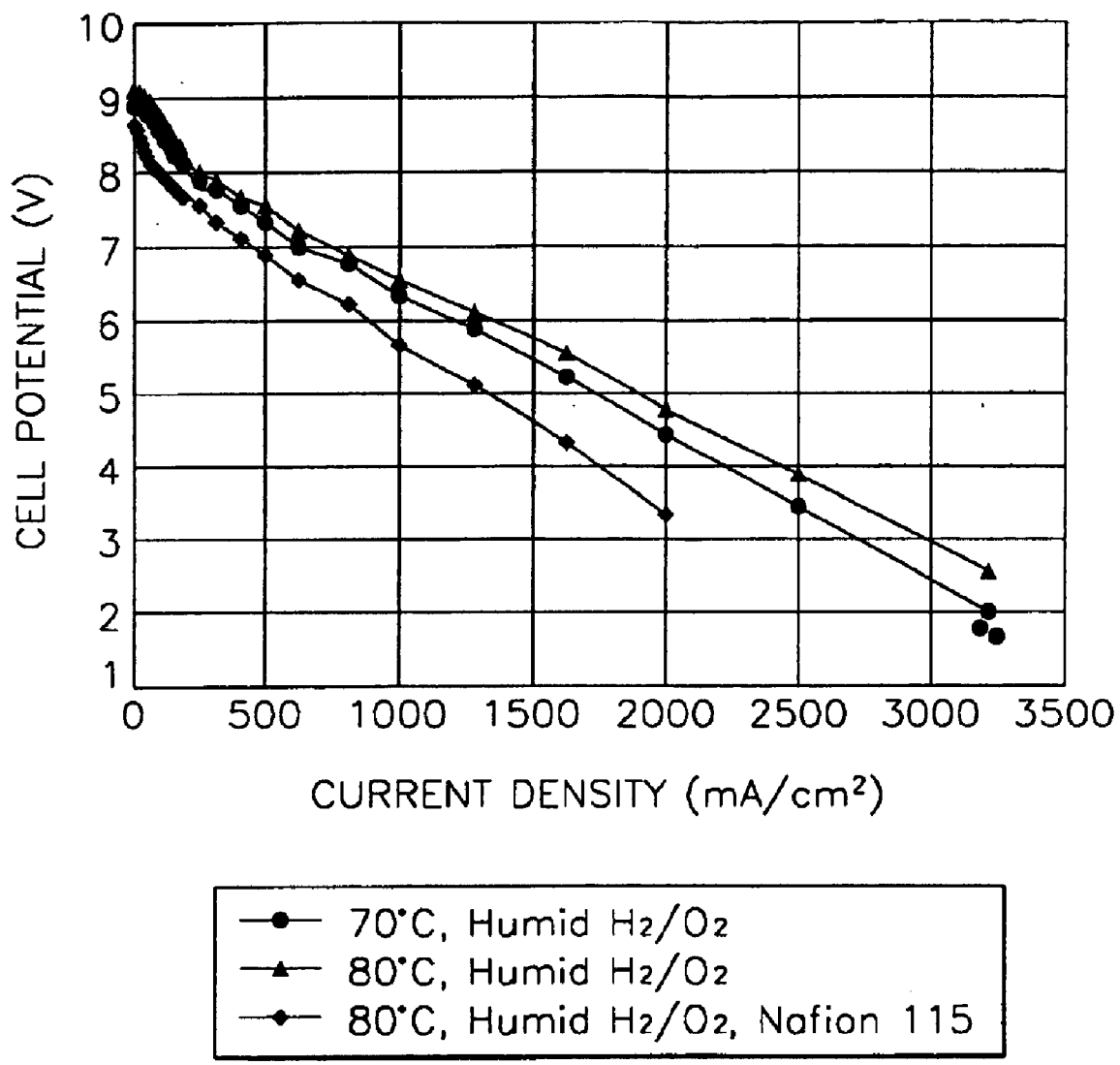
FIG. 3 is a graph illustrating the variation in cell potential of the proton exchange membrane fuel cell (PEMFC) manufactured in Example 1 with respect to current density.
Figure 4:
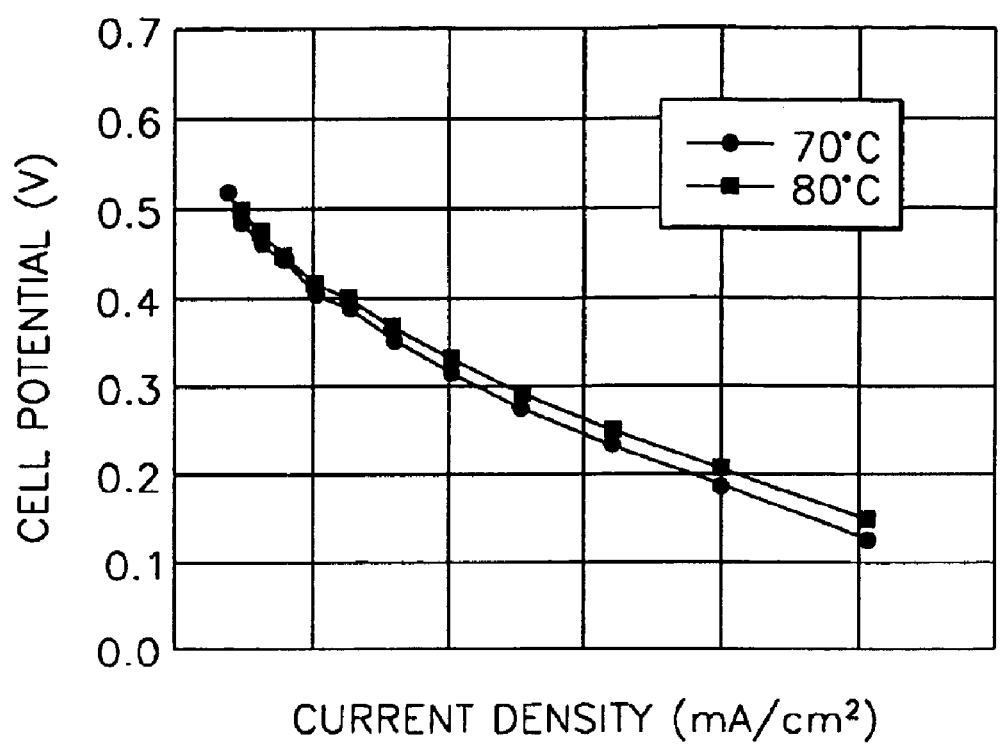
FIG. 4 is a graph illustrating the variation in cell potential of the inventive direct methanol fuel cell (DMFC) manufactured in Example 2 with respect to current density.

Performance of the fuel cells manufactured in Examples 1 through 3 was evaluated. The results are shown in FIGS. 3 and 4. FIGS. 3 and 4 show variations in cell potential of the PEMFC of Example 1 and the DMFC of Example 3, respectively, with respect to current density. As shown in FIGS. 3 and 4, the PEMFC and DMFC which adopt the ionic conductive layer formed of the copolymer of Synthesis Example 1 have good cell potential characteristics at a temperature of 70–80° C. Here, the cell potential characteristic of the PEMFC and DMFC was measured by measuring a voltage level with application of current while fuel is supplied to the cell. The cell potential characteristic is evaluated as excellent when the voltage level increases with application of a constant current.

The copolymer having formula (1) according to the present invention includes trifluorostyrene units and substituted vinyl compound units, which can be partially crosslinked. Ionic conductive polymer membranes can be manufactured using the copolymer at low cost, with excellent mechanical properties. When a partially crosslinked copolymer is used, the degree of swelling of the resulting polymer membrane and fuel crossover can be reduced compared with a conventional polymer. The efficiency of fuel cells can be improved by applying the polytrifluorostyrene-based ionic conductive copolymer membrane.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An ionic conductive polymer membrane comprising a partially fluorinated copolymer having formula (1):

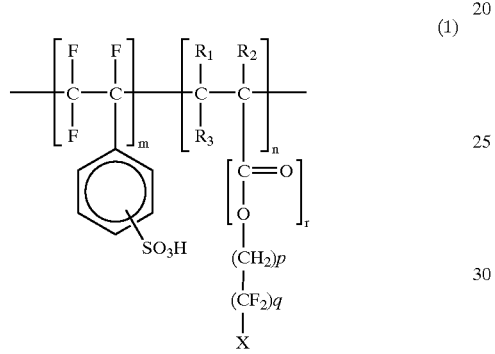

(1)

wherein each of $R_1$, $R_2$ and $R_3$ independently is selected from the group consisting of H and $CH_3$; X is a hydroxy group or a trifluoromethyl group; m is an integer greater than zero; n is an integer greater than zero; and p, q and r are zero or integers greater than zero.

2. The ionic conductive polymer membrane of claim 1, wherein, in formula (1), m is an integer from 1 to 50, n is an integer from 1 to 50; p is zero or an integer from 1 to 12; and q is zero or an integer from 1 to 12.

3. The ionic conductive polymer membrane of claim 1, wherein the partially fluorinated copolymer having formula (1) is a compound having one selected from formulas (2) to (5):

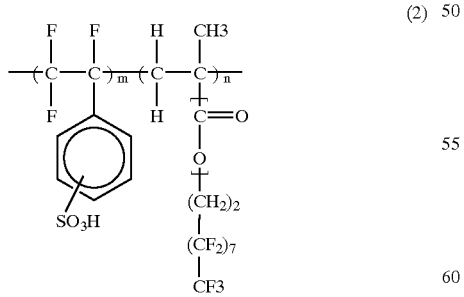

(2)

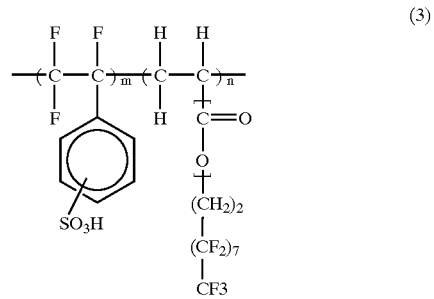

(3)

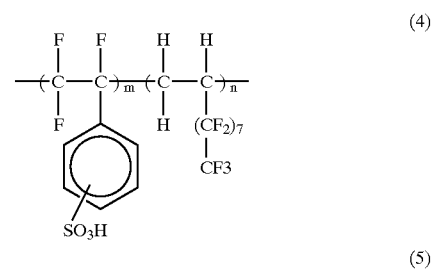

(4)

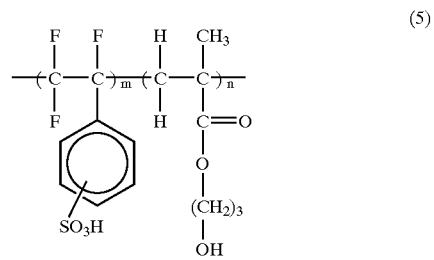

(5)

where m is an integer from 1 to 50; and n is an integer from 1 to 50.

4. The ionic conductive polymer membrane of claim 1, wherein the partially fluorinated copolymer having formula (1) has a weight average molecular weight of about 30,000 to about 500,000.

5. The ionic conductive polymer membrane of claim 1, wherein the partially fluorinated copolymer is partially crosslinked using a crosslinking agent.

6. The ionic conductive polymer membrane of claim 5, wherein the crosslinking agent comprises at least one selected from the group consisting of divinyl benzene, diallyl ether, triallyl ether, diglycidyl ether and ethylene glycol dimethacrylate.

* * * * *